United States Patent [19]
Lim

[11] Patent Number: 6,019,816
[45] Date of Patent: Feb. 1, 2000

[54] SYSTEMS AND METHODS FOR REMOVING RESIDUE FROM PROCESS GASES EXHAUSTED FROM MICROELECTRONIC DEVICE FABRICATION PROCESSES

[75] Inventor: Yu-il Lim, Kyonggi-do, Rep. of Korea

[73] Assignee: Samsung Electronics Co., Ltd., Rep. of Korea

[21] Appl. No.: 09/086,016

[22] Filed: May 28, 1998

[30] Foreign Application Priority Data

Jun. 3, 1997 [KR] Rep. of Korea .................. 97-22849

[51] Int. Cl.[7] .................. B01D 47/14; B01D 53/04
[52] U.S. Cl. .................. 95/92; 95/94; 95/212; 95/224; 95/281; 96/122; 96/130; 96/131; 96/143; 96/228; 96/290; 96/300; 96/378
[58] Field of Search .................. 55/385.1, 385.2; 95/92, 93, 94, 210, 211, 212, 213, 281, 223, 224; 96/134, 135, 136, 139, 141, 233, 290, 295, 372, 378, 228, 143, 121, 122, 131, 130, 132, 300; 438/905, 909

[56] References Cited

U.S. PATENT DOCUMENTS

| | | | |
|---|---|---|---|
| 3,122,594 | 2/1964 | Kielback | 95/211 |
| 3,302,372 | 2/1967 | Hynson et al. | 95/211 |
| 3,432,994 | 3/1969 | Whiton et al. | 95/211 |
| 3,507,051 | 4/1970 | Calvert et al. | 95/92 |
| 3,556,490 | 1/1971 | Bockman | 95/211 |
| 3,739,551 | 6/1973 | Eckert | 96/290 |
| 4,105,722 | 8/1978 | Sorenson | 261/94 |
| 4,110,088 | 8/1978 | Cold et al. | 95/211 |
| 4,906,257 | 3/1990 | Fukunaga et al. | 55/312 |
| 4,940,213 | 7/1990 | Ohmine et al. | 96/136 |
| 5,211,729 | 5/1993 | Sherman | 55/319 |
| 5,460,636 | 10/1995 | Harada et al. | 96/134 |
| 5,584,959 | 12/1996 | Kimura et al. | 156/345 |
| 5,649,985 | 7/1997 | Imamura | 55/431 |
| 5,735,919 | 4/1998 | Fujii et al. | 55/331 |
| 5,743,939 | 4/1998 | Lee et al. | 95/214 |
| 5,788,747 | 8/1998 | Horiuchi et al. | 55/385.1 |
| 5,820,658 | 10/1998 | Kim et al. | 95/288 |
| 5,851,293 | 12/1998 | Lane et al. | 95/22 |
| 5,855,651 | 1/1999 | Kurita et al. | 55/302 |

FOREIGN PATENT DOCUMENTS

63-256116 10/1988 Japan .................. 95/92

*Primary Examiner*—Duane S. Smith
*Attorney, Agent, or Firm*—Myers Bigel Sibley & Sajovec, P.A.

[57] ABSTRACT

Process gases from microelectronic device fabrication processes are pumped through a filter unit including a plurality of absorbers for absorbing water entrained within the process gases. Residues deposited within the filtering unit are removed by spraying water on the absorbers. Water is prevented from escaping from the filtering unit into other portions of an exhaust gas system or into the environment by providing a curtain of pressurized, inert gas, within the filtering unit.

42 Claims, 7 Drawing Sheets

SYSTEMS AND METHODS FOR REMOVING RESIDUE FROM PROCESS GASES EXHAUSTED FROM MICROELECTRONIC DEVICE FABRICATION PROCESSES

FIELD OF THE INVENTION

The present invention relates generally to microelectronic device processing and, more particularly, to the treatment of exhaust gases from microelectronic device processing operations.

BACKGROUND OF THE INVENTION

Microelectronic device processing, such as semiconductor fabrication, may utilize various process gases. Gases utilized in microelectronic device processing may not be completely used up during processing and may be left over as waste gas. In order to prevent waste gas from escaping to the environment, scrubbers may be provided to neutralize the waste gas.

FIG. 1 is a schematic block diagram of a conventional exhaust gas system for treating waste gas from microelectronic device processing. A process gas stored in a gas cabinet 10 is fed into a process chamber 20 where microelectronic device fabrication processing is carried out. A vacuum pump 30 pumps process gas remaining in the process chamber 20 into a scrubber 40, via a first suction tube 1, where the process gas is cleaned, neutralized and exhausted using cleaning water. However, when the scrubber 40 is used for a long time, the cleaning water may be discharged from the scrubber together with the processed gas, which may result in operational problems. Therefore, conventional gas exhaust systems may include a residue removing and blocking apparatus 50 connected to the scrubber 40, via a second suction tube 2, in order to prevent cleaning water from being discharged from the scrubber.

Referring to FIG. 2, a schematic perspective view of a conventional residue removing and blocking apparatus for a gas exhaust system is provided. The residue removing and blocking apparatus 50 includes a container 50a that is formed of transparent polyvinyl chloride (PVC), and that contains a plurality of filtering members or absorbers 50b that may also be formed of transparent PVC. The container 50a is connected to a suction pump 60 as illustrated.

Cleaning water that is exhausted with a process gas is pulled via the suction pump 60, into the container 50a of the residue removing and blocking apparatus 50 through the suction tube 2. The cleaning water pulled in with the process gas is absorbed by the filtering absorbers 50b so that the processed waste gas can be exhausted free of cleaning water entrained therein. In effect, the processed waste gas is "dehumidified."

Generally, the residue removing and blocking apparatus 50 is cleaned on a periodic basis, such as every couple of days. Cleaning protects against operational failure of the gas exhaust system due to degradation in the efficiency of the residue removing and blocking apparatus 50. Unfortunately, conventional residue removing and blocking devices may have several disadvantages. Cleaning water may not be completely absorbed by the filtering absorbers and may be exhausted with the processed waste gas which may result in pollution or damage to other parts of the processing equipment. Other process residual material may be pulled into the residue removing and blocking apparatus together with the cleaning water.

The process residual material may be absorbed into the absorbers and changed into a powder form. The residue powder may block off the input line for the cleaning water, which may serve as an obstacle to smooth and efficient performance of a suction pump. Furthermore, the amount of cleaning water may be considerably reduced because of a blocked input line. In addition, the residue powder may be discharged out of the system causing environmental pollution. The residue removing and blocking apparatus may require periodic cleaning, which may reduce operational efficiency of the microelectronic device processing.

SUMMARY OF THE INVENTION

It is therefore an object of the present invention to reduce and preferably to prevent process residues from escaping from an exhaust gas system used in conjunction with microelectronic device fabrication processes.

It is another object of the present invention to provide an exhaust gas system residue and blocking apparatus wherein the accumulation of residue powder so as to cause blockage therewithin can be reduced.

It is another object of the present invention to provide an exhaust gas system residue and blocking apparatus which may not need to be cleaned as often as conventional residue and blocking apparatus.

These and other objects are provided by systems and methods for removing residue from exhausted microelectronic device processing gases wherein the gases are pumped through a filtering unit, residues deposited within the filtering unit are removed, and water is prevented from escaping from the filtering unit. One or more filtering units may be utilized to absorb water entrained within the processing gases. Each filtering unit may include a plurality of filtering members or absorbers formed from an absorbing material such as polyvinyl chloride (PVC). Residue deposited within each filtering unit may be removed by spraying a pressurized liquid, such as water, on the absorbers, and then removing the liquid and residue from each filtering unit. Water may be prevented from escaping from a filtering unit by providing a curtain of pressurized, inert gas, within the filtering unit.

The present invention may be utilized in exhaust gas systems of various microelectronic device fabrication processes where process gases are utilized. The present invention may allow process residues to be removed from process gases without blocking flow within an exhaust gas system and without allowing the process residues to escape to other portions of an exhaust gas system or to the environment. Furthermore, the present invention may facilitate exhaust gas system efficiency by helping to maintain a substantially constant vacuum within the exhaust gas system. Required outages for cleaning exhaust gas systems may also be reduced as a result of the present invention. The present invention may be particularly advantageous when used in conjunction with semiconductor processes using water soluble gases.

BRIEF DESCRIPTION OF THE DRAWINGS

The accompanying drawings, which are incorporated in and constitute a part of the specification, illustrate embodiments of the invention and, together with the description, serve to explain principles of the invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
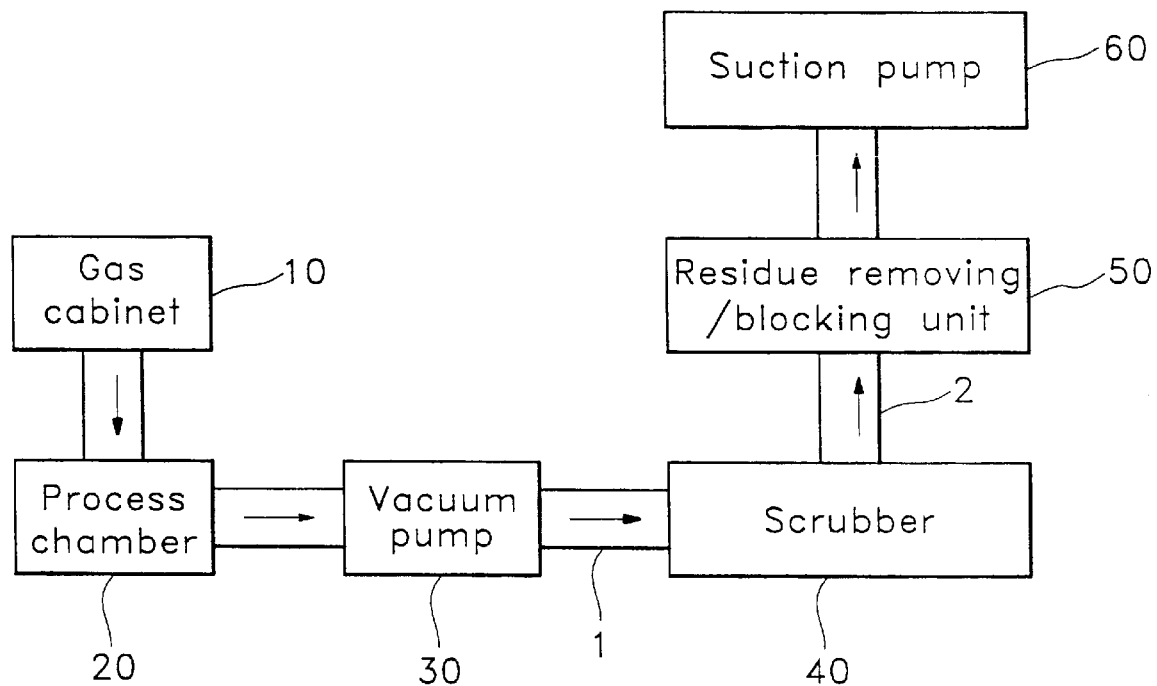
FIG. 1 is a schematic block diagram of a conventional gas exhaust system.
Figure 2:
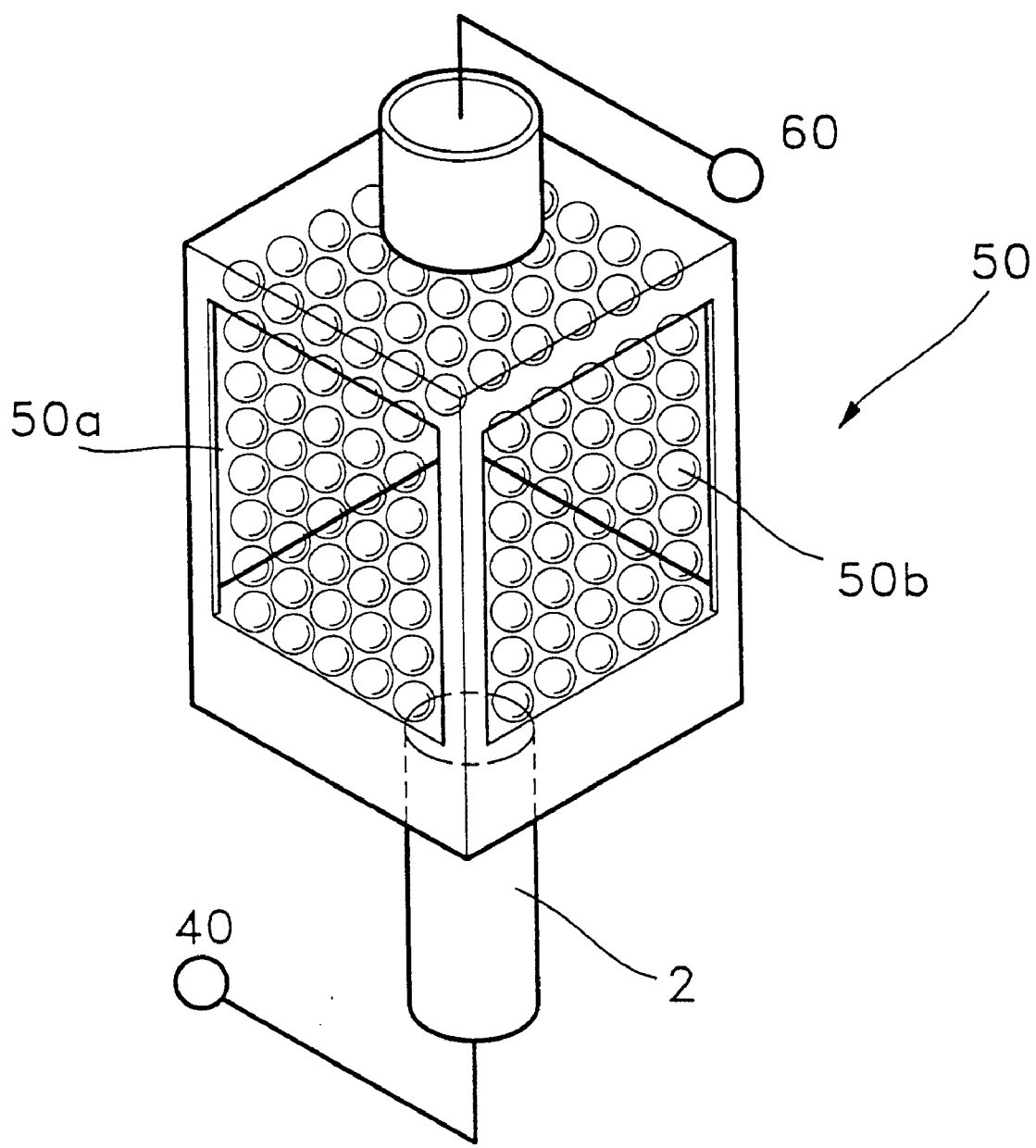
FIG. 2 is a schematic perspective view of a conventional residue removing and blocking apparatus.

Prior to description of the present invention, the operation of a scrubber for treating exhaust gases will be described referring to FIG. 3. First, when a microelectronic device fabrication process has been completed, a residual process gas, such as $NF_3$, remaining in a process chamber (20 FIG. 1) is introduced into the scrubber 40 through a suction tube 1 via a vacuum pump. The introduced process gas may include various process residues.

The illustrated scrubber 40 is divided into first and second portions by an isolation member 44. The first portion 45 is filled with a plurality of absorbers 41. The second portion 46 is configured to retain cleaning water 47. The cleaning water 47 is preferably maintained at a substantially constant, predetermined level by a level sensor (not shown).

A cleaning water suction tube 43 extends through the first and the second portions 45 and 46 of the scrubber 40, as illustrated. The cleaning water 47 in the second portion 46 is pumped into the scrubber first portion 45 through the cleaning water suction tube 43 by a cleaning water pump (not shown) and sprayed onto the absorbers 41 by a cleaning water supplying unit 42 as illustrated. As a result, process residues contained in the process gas are absorbed by the absorbers 41.

Process residues not completely removed in the scrubber 40 and the cleaning water 47 used for washing the process residues, are pumped through an exhaust tube 2 into a residue and blocking apparatus 100 via suction pump 60. The suction pump 60 preferably provides the scrubber 40 with uniform vacuum via the exhaust tube 2, such that the process gas is pulled into the scrubber 40 under a substantially constant vacuum. Preferably, a vacuum of between about 1.0 mm Hg and about 2.5 mm Hg is maintained in the suction tube 1. A vacuum gauge 5 is preferably provided to measure vacuum within the suction tube 1 as illustrated.

Figure 3:
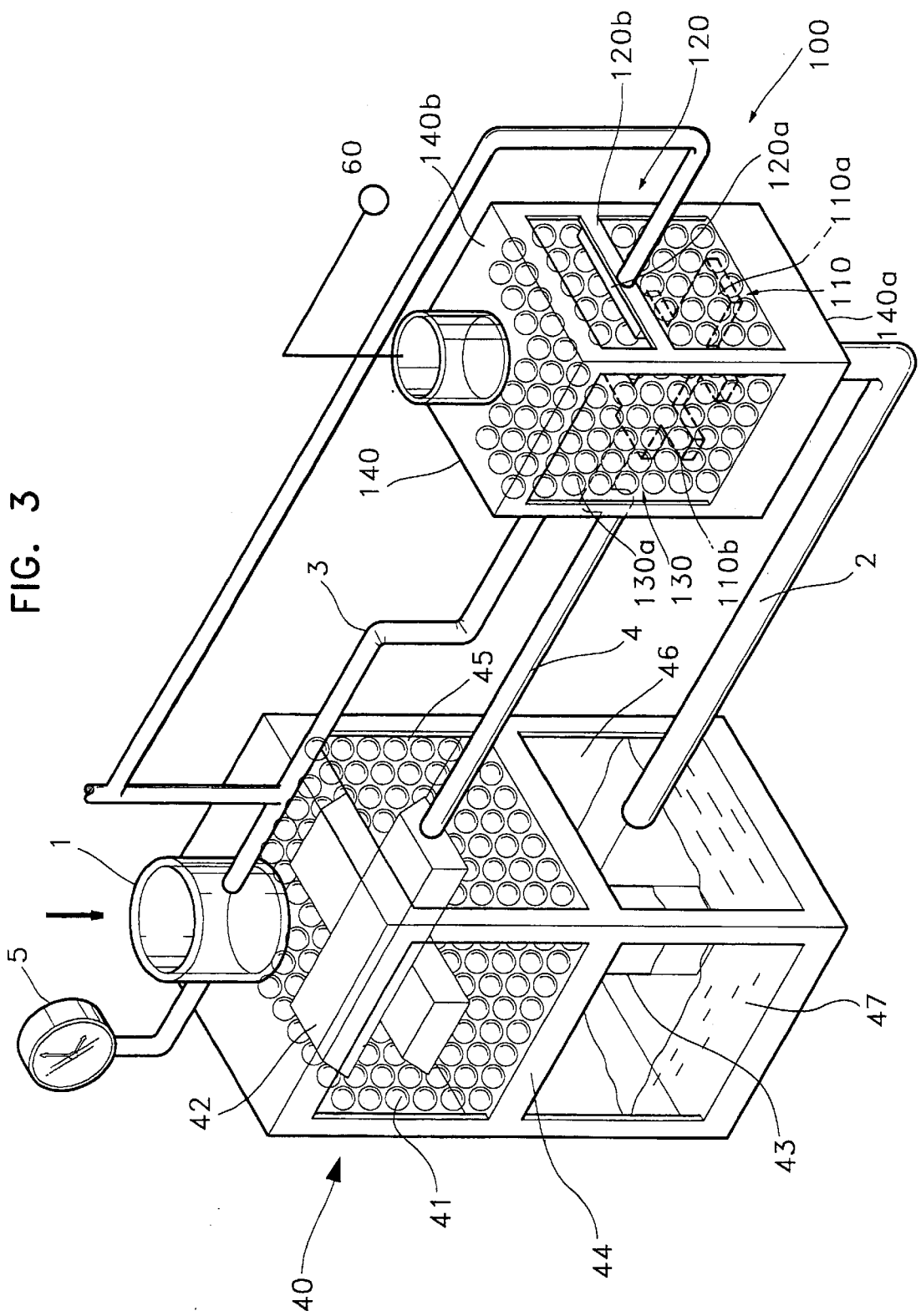
FIG. 3 is a schematic perspective view of a first embodiment of the present invention.

According to the illustrated embodiment of FIG. 3, the residue removing and blocking apparatus 100 includes a container 140 containing a filtering unit 130. The container 140 includes a lower portion 140a and an upper portion 140b and is in fluid communication with the scrubber second portion 46. The filtering unit 130 includes a plurality of filtering members or absorbers 130a for filtering process gas and cleaning water introduced therein via the exhaust tube 2. A residue-removing unit 110 is installed in the container 140 near the exhaust tube 2, as illustrated. The residue removing unit 110 removes residues formed in the filtering unit 130 by spraying a liquid therein. A cleaning water blocking unit 120, installed in the container 140 over the residue removing unit 110, as illustrated, helps prevent cleaning water from escaping from the filtering unit 130 by spraying a gas within the filtering unit. The container 140 and the absorbers 130a are preferably formed from an absorbing material such as PVC. PVC is particularly preferable because of its good resistance to the corrosive nature of process residues produced during microelectronic device processing. Preferably, the residue-removing unit 110 is formed from corrosion-resistant material such as PVC, stainless steel, and the like.

Over time, the process residues within the filtering unit 130 may build up in powder form and block the exhaust tube 2. The residue-removing unit 110 serves as means for removing residue deposited within the filtering unit 130 and prevents blockage of the exhaust tube 2. The illustrated residue removing unit 110 includes a main spraying unit 110a having a rectangular shape, and a plurality of auxiliary spraying units 110b formed by extending side portions of the main spraying unit 110a. Cleaning water is supplied to the residue removing unit 110 from the cleaning water supply unit 42 of the scrubber 40 through a first supply tube 4.

In operation, process residues are discharged from the scrubber second portion 46 into the residue removing and blocking apparatus 100 via the exhaust tube 2. These process residues are collected within the filtering unit 130. As residue powder forms and begins to block off the exhaust tube 2, the main spraying unit 110a distributes water provided from the cleaning water supply unit 42 of the scrubber 40 to the respective auxiliary spraying units 110b. Accordingly, uniform amounts of water are sprayed onto the absorbers 130a through nozzles (not shown) within the main and the auxiliary spraying units 110a and 110b. As a result, any residue powder blocking off the exhaust tube 2 is washed and carried down with the water into the scrubber second portion 46 via the exhaust tube 2. Water supply pressure is preferably between about 0.5 $Kg/cm^2$ and 1.5 $Kg/cm^2$, and more preferably, supply pressure is about 1 $Kg/cm^2$. By preventing residue powder from blocking off the exhaust tube 2, the residue-removing unit 110 is capable of maintaining a substantially constant vacuum via the suction pump 60.

Figure 4:
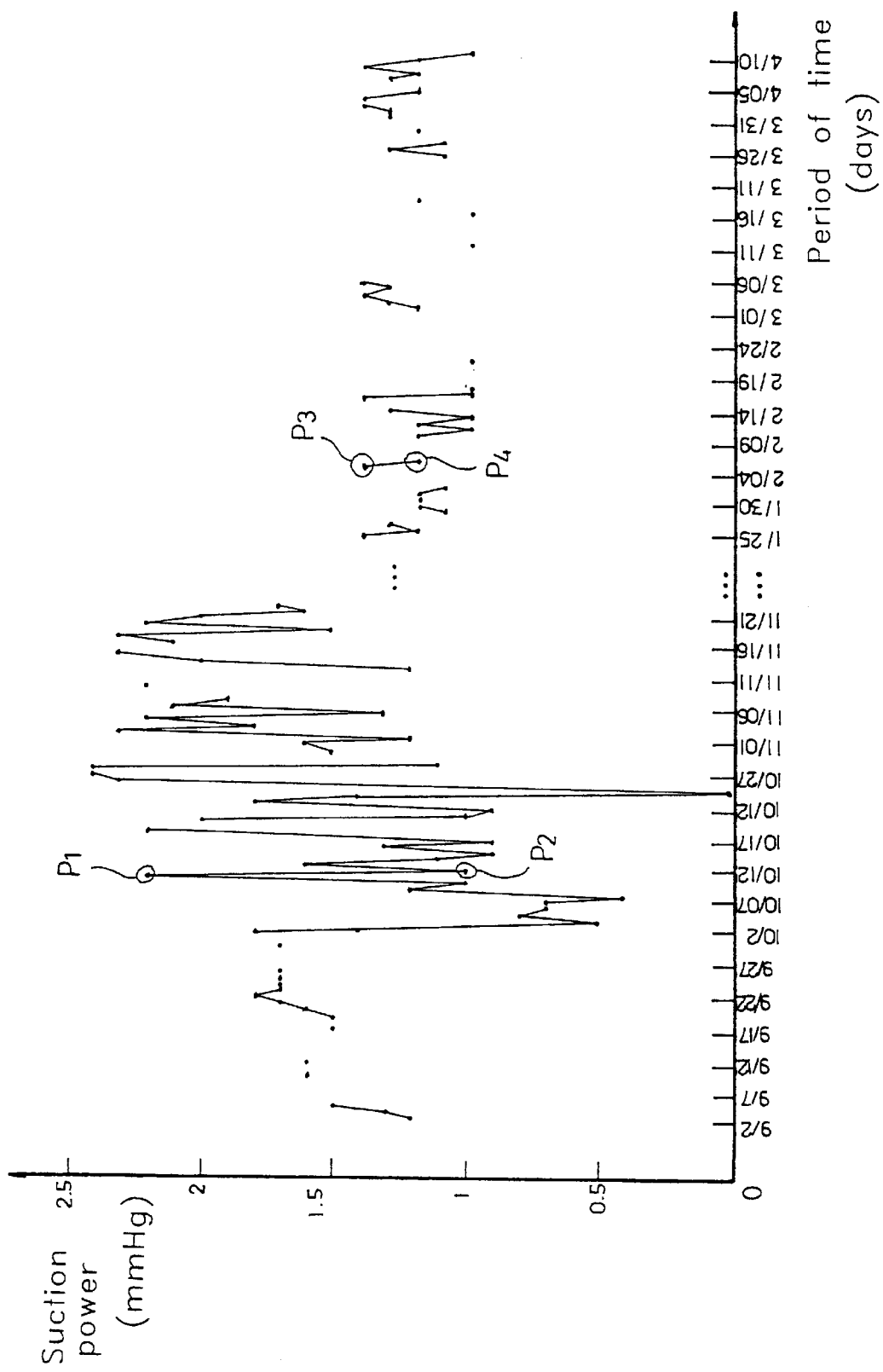
FIG. 4 is a graph schematically showing results of measuring suction power of a suction pump.

Referring now to FIG. 4, suction power of the suction pump 60 is plotted over time to illustrate the effect the residue-removing unit 110 has over suction power. The vertical and the horizontal axes of the graph in FIG. 4 represent suction power (mmHg) of the suction pump and period of time (days), respectively. During the period of September 2 to November 21, the residue-removing unit 110 was not used. As illustrated, there is a wide difference between suction power P1 after the apparatus is cleaned and suction power P2 before the apparatus is cleaned. This illustrates the need to frequently clean the apparatus in order to maintain a substantially constant vacuum.

By comparison, for the time period after January 25, a residue-removing unit 110 was used according to the present invention. As illustrated, the variance between suction power P3 after the apparatus is cleaned and the suction power P4 before the apparatus is cleaned is much less than the variance between P1 and P2. Accordingly, the present invention reduces the need for frequent cleaning jobs and facilitates maintaining good suction efficiency of the suction pump 60.

Because good suction efficiency can be maintained, substantially constant vacuum can be maintained within the scrubber 40 to constantly exhaust the process residues from the suction tube 1 through the scrubber 40. As a result, unforeseen operational problems associated with the leakage of the process residues may be avoided.

Preferably, the residue-removing unit 110 is installed at a location of between about 3/14 to 1/2 of the distance from the lower portion 140a of the container 140 to the upper portion 140b of the container 140. More preferably, the residue-removing unit 110 is installed at a location of 5/14 of the distance from the lower portion 140a to the upper portion 140b of the container 140. If the residue-removing unit 110 is installed at a location towards the upper portion 140b of the container 140, the sprayed water may escape from the container 140, which may cause operational problems.

Figure 5:
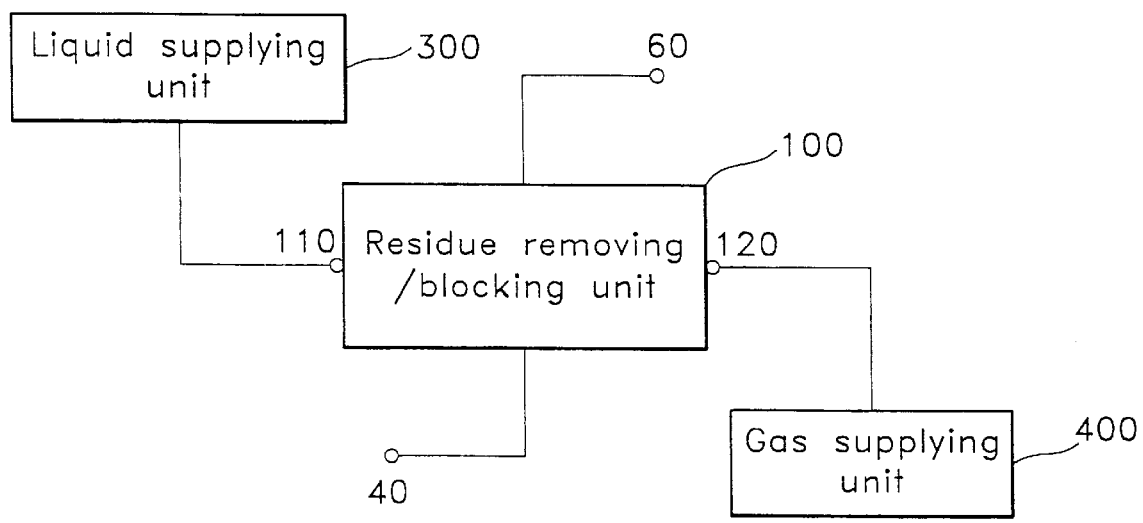
FIG. 5 is a schematic block diagram of a first embodiment of the present invention.

Referring now to FIG. 5, the residue removing unit 110 may also be supplied with water from a separately installed liquid supply unit 300, instead of from the cleaning water supply unit 42 (FIG. 3) of the scrubber 40. The separately installed liquid supply unit 300 facilitates easily adjusting liquid supply pressure. Accordingly, this additional water supply enhances residue powder removal.

The process gas passing through the residue-removing unit 110 flows into the upper portion 140b of the container 140 via the filtering unit 130. The process gas contains the cleaning water used in the scrubber 40. Referring back to FIG. 3, a cleaning water-blocking unit 120 is provided within the upper portion of the container 140. The cleaning water blocking unit 120 includes nozzles 120a for spraying gas and a nozzle-supporting member 120b fixed to the container 140 as illustrated. The nozzles 120a are connected to a gas-supplying unit 400 (FIG. 5) by a second supply tube 3 and are supplied with gas for preventing the cleaning water from being discharged out.

The operation of the cleaning water blocking unit 120 will be described hereinafter. Gas is supplied through the second supply tube 3 and is sprayed into the container 140 through the nozzles 120a. As a result, the gas accumulates in the container 140 and forms a gas curtain (not shown) that performs a humidity-blocking function that prevents the cleaning water from escaping from the container 140.

The rate of gas sprayed by the cleaning water blocking unit 120 is preferably between about 20 cm$^3$ to 40 cm$^3$ per minute. More preferably, the rate is about 30 cm$^3$ per minute. Preferably, the gas sprayed into the container 140 is an inert gas having an infinitesimal chemical affinity, such as nitrogen and argon, to thereby prevent any chemical reaction between the gas curtain and the process gas.

Figure 6:
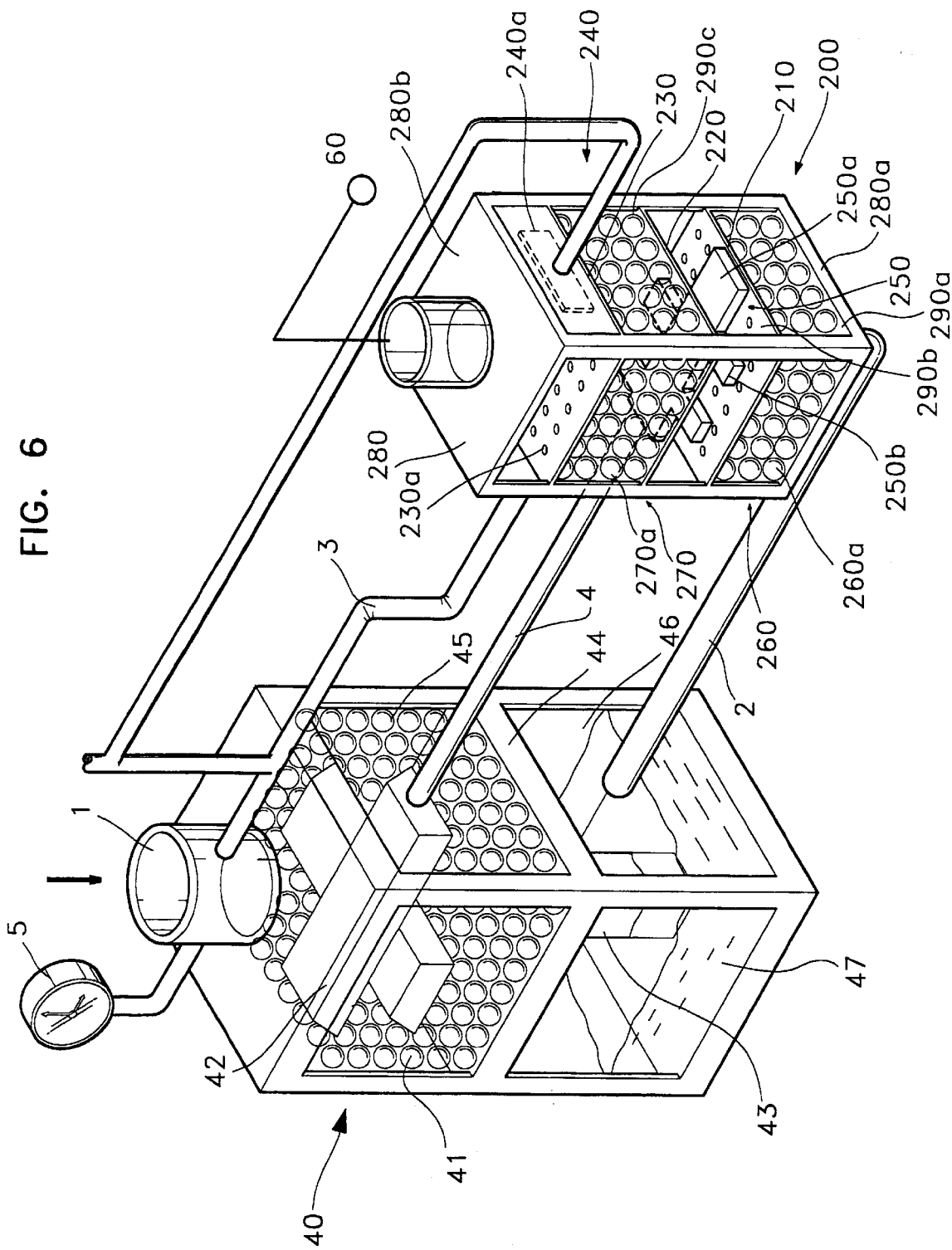
FIG. 6 is a schematic perspective view of a second embodiment of the present invention.

Referring now to FIG. 6, another embodiment of a residue removing and blocking apparatus 200 gas exhaust system according to present invention is illustrated. The illustrated residue removing and blocking apparatus 200 comprises: a container 280 including a lower portion 280a and an upper portion 280b and that is in fluid communication with the scrubber 40 via an exhaust tube 2. The container 280 includes a first isolation member 210 that is spaced apart from the lower portion 140a of the container 280 by a predetermined distance. A second isolation member 220 is spaced apart from the first isolation member 210 by a predetermined distance, as illustrated.

A first filtering unit 260, includes a plurality of absorbers 260a, and is located within a first compartment 290a defined by the area between the first isolation member 210 and the container lower portion 280a. The first filtering unit 260 filters the process gas and cleaning water introduced via the exhaust tube 2. A residue removing unit 250 is installed within a second compartment 290b, located between the first and the second isolation members 210 and 220 as illustrated. The residue removing unit 250 removes process residues formed in the first filtering unit 260 by spraying a liquid thereon via main spraying units 250a and auxiliary spraying units 250b, as illustrated. A second filtering unit 270 includes a plurality of absorbers 270a, and is installed within a third compartment 290c located above the second isolation member 220, as illustrated. The second filtering unit 270 filters the process gas and cleaning water introduced via the exhaust tube 2 after the process gas and the cleaning water flows through the first filtering unit 260. A cleaning water blocking unit 240 is installed in an upper portion of the second filtering unit 270, as illustrated. A gas sprayed by the cleaning water blocking unit 240 via nozzles 240a prevents the cleaning water from escaping. In the illustrated embodiment, a third isolation member 230 is installed between the second filtering unit 270 and the cleaning water blocking unit 240.

As illustrated in FIG. 6, the first and the second filtering units 260 and 270, the residue removing unit 250, and the cleaning water blocking unit 240, are separated by a plurality of isolations members 210, 220 and 230. The isolation members 210, 220 and 230 provide structural stability to the residue removing and blocking apparatus 200. Each of the respective isolation members 210, 220 and 230 have a plurality of apertures 230a formed therein to limit flow of a process gas and residue therethrough. Various numbers and configurations of apertures 230a may be utilized. Preferably, the first, second and third isolation members 210, 220 and 230 are formed of a corrosion-resistant material such as PVC, stainless steel, and the like.

Each of the apertures 230a formed in the isolation members 210, 220 and 230 preferably has a diameter of between 2.5 $\pi$ cm to 3.5 $\pi$ cm. More preferably, the diameter of each of the through holes 230a is about 3 $\pi$ cm.

Figure 7:
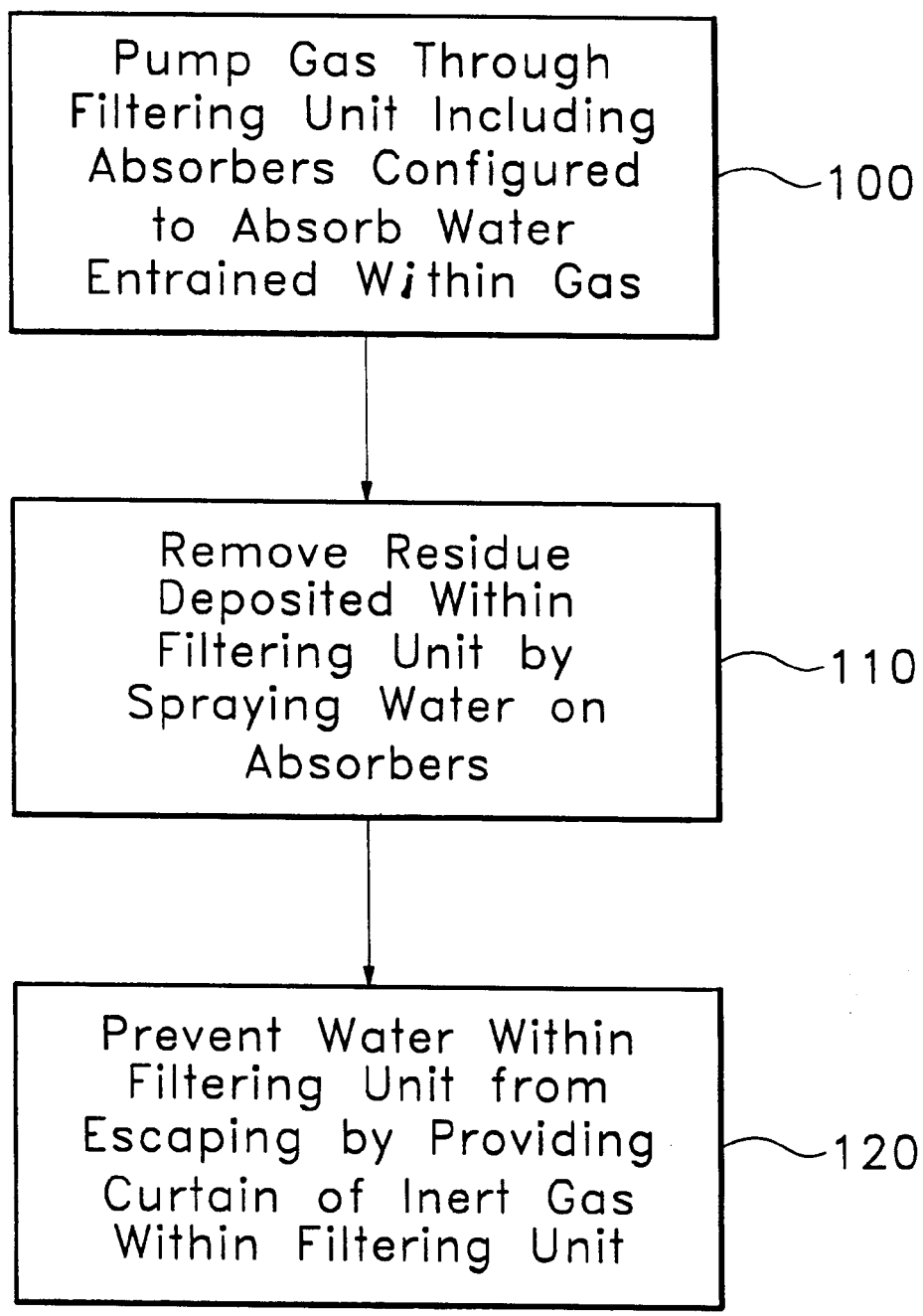
FIG. 7 schematically illustrates steps for removing residue from gas exhausted from a microelectronic device fabrication process, according to the present invention.

Referring now to FIG. 7, steps for removing residue from gas exhausted from a microelectronic device fabrication process, according to aspects of the present invention, are schematically illustrated. Gas is pumped through a filtering unit comprising a plurality of absorbers configured to absorb water entrained within said gas (Block 100). Residue deposited within the filtering unit by the process gas is removed by spraying water on the absorbers within the filtering unit (Block 110). Water within the filtering unit is prevented from escaping from the filtering unit (Block 120).

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. An apparatus for removing residue from process gas exhausted from a microelectronic device fabrication process, said apparatus comprising:

a container;

a filtering unit within said container, said filtering unit comprising a plurality of absorbers configured to absorb water entrained within said process gas;

means for removing residue deposited within said filtering unit by said process gas; and means for providing a pressurized gas within said filtering unit to prevent water from escaping from said filtering unit.

2. An apparatus according to claim 1 wherein said plurality of absorbers comprise polyvinyl chloride (PVC).

3. An apparatus according to claim 1 wherein said means for removing residue deposited within said filtering unit comprises means for spraying a liquid on said plurality of absorbers.

4. An apparatus according to claim 3 wherein said means for removing residue deposited within said filtering unit comprises means for removing said liquid and residue from said filtering unit.

5. An apparatus according to claim 3 wherein said means for spraying a liquid on said plurality of absorbers comprises:

a main spraying unit; and a plurality of auxiliary spraying units extending from said main spraying unit.

6. An apparatus according to claim 5 wherein said main spraying unit comprises a substantially rectangular shape and wherein said plurality of auxiliary spraying units extend from sides of said main spraying unit.

7. An apparatus according to claim 5 wherein said main spraying unit and said auxiliary spraying units comprise corrosion-resistant material selected from the group consisting of PVC and stainless steel.

8. An apparatus according to claim 3 wherein said container includes an upper portion and a lower portion and wherein said means for spraying a liquid on said plurality of absorbers is located less than or equal to one-half a distance from said container lower portion to said container upper portion.

9. An apparatus according to claim 1 wherein said means for providing a pressurized gas within said filtering unit comprises corrosion-resistant material selected from the group consisting of PVC and stainless steel.

10. An apparatus for removing residue from process gas exhausted from a microelectronic device fabrication process, said apparatus comprising:

a container including an upper portion and a lower portion;

first and second isolation members spaced apart within said container to form first, second and third compartments, respectively, within said container, wherein said first compartment is adjacent said container lower portion;

a first filtering unit within said container first compartment, said first filtering unit comprising a plurality of absorbers configured to absorb water entrained within said process gas;

means for moving residue deposited within said first filtering unit by said process gas, said residue removing means located within said container second compartment, wherein said container second compartment overlies said container first compartment;

a second filtering unit within said container third compartment, said second filtering unit comprising a plurality of absorbers configured to absorb water entrained within said process gas, wherein said container third compartment overlies said container second compartment; and means for providing a pressurized gas within said filtering unit to prevent water from escaping from said second filtering unit.

11. An apparatus according to claim 10 further comprising a third isolation member positioned between said second filtering unit and said means for preventing water from escaping from said second filtering unit.

12. An apparatus according to claim 10 wherein said first and second isolation members comprise a plurality of apertures formed therethrough.

13. An apparatus according to claim 11 wherein said third isolation members comprises a plurality of apertures formed therethrough.

14. An apparatus according to claim 12 wherein each aperture comprises a diameter between about $2.5\pi$ cm and $3.5\pi$ cm.

15. An apparatus according to claim 13 wherein each aperture comprises a diameter between about $2.5\pi$ cm and $3.5\pi$ cm.

16. An apparatus according to claim 11 wherein said first, second and third isolation members comprise corrosion-resistant material selected from the group consisting of PVC and stainless steel.

17. A system for treating process gas exhausted from a microelectronic device fabrication process, said system comprising:

a scrubber;

a container in fluid communication with said scrubber and including an upper portion and a lower portion;

a filtering unit within said container, said filtering unit comprising a plurality of absorbers configured to absorb water entrained within gas exhausted from said scrubber into said container;

means for removing residue deposited within said filtering unit by said gas; and means for preventing water from escaping from said filtering unit.

18. A system according to claim 17 wherein said means for removing residue from said process gas collected within said filtering unit comprises means for spraying a liquid on said plurality of absorbers.

19. A system according to claim 18 further comprising means for removing said liquid and residue from said filtering unit.

20. A system according to claim 18 wherein said liquid is supplied from said scrubber.

21. A system according to claim 18 wherein said liquid is supplied from a source external from said scrubber and said container.

22. A system according to claim 18 wherein said means for spraying a liquid on said plurality of absorbers is located less than or equal to one-half a distance from said container lower portion to said container upper portion.

23. A system according to claim 17 wherein said means for preventing water from escaping from said filtering unit comprises means for providing a pressurized gas within said filtering unit.

24. A method for removing residue from gas exhausted from a microelectronic device fabrication process, said method comprising the steps of:

pumping the gas through at least one filtering unit comprising a plurality of absorbers configured to absorb water entrained within said gas;

removing residue deposited within the at least one filtering unit by the process gas; and providing the at least one filtering unit with an inert gas to prevent the water from escaping from the at least one filtering unit.

25. A method according to claim 24 wherein said step of removing residue from the process gas collected within the filtering unit comprises spraying a liquid on the plurality of absorbers.

26. A method according to claim 25 wherein the liquid is supplied at a pressure of between about 0.5 Kg/cm$^2$ and about 1.5 Kg/cm$^2$.

27. A method according to claim 25 wherein the liquid comprises water.

28. A method according to claim 24 wherein the gas is provided at a rate of between about 20 cm$^3$ per minute and about 40 cm$^3$ per minute.

29. A method according to claim 24 wherein the gas is selected from the group consisting of nitrogen and argon.

30. An apparatus for removing residue from process gas exhausted from a microelectronic device fabrication process, said apparatus comprising:

a container including an upper portion and a lower portion;

a filtering unit within said container, said filtering unit comprising a plurality of absorbers configured to absorb water entrained within said process gas;

means for spraying a liquid on said plurality of absorbers to remove residue deposited within said filtering unit by said process gas, wherein said spraying means is located less than or equal to one-half a distance from said container lower portion to said container upper portion; and means for preventing water from escaping from said filtering unit.

31. An apparatus according to claim 30 wherein said plurality of absorbers comprise polyvinyl chloride (PVC).

32. An apparatus according to claim 30 wherein said means for removing residue deposited within said filtering unit comprises means for removing said liquid and residue from said filtering unit.

33. An apparatus according to claim 30 wherein said means for spraying a liquid on said plurality of absorbers comprises:

a main spraying unit; and a plurality of auxiliary spraying units extending from said main spraying unit.

34. An apparatus according to claim 33 wherein said main spraying unit comprises a substantially rectangular shape and wherein said plurality of auxiliary spraying units extend from sides of said main spraying unit.

35. An apparatus according to claim 33 wherein said main spraying unit and said auxiliary spraying units comprise corrosion-resistant material selected from the group consisting of PVC and stainless steel.

36. An apparatus according to claim 30 wherein said means for preventing water from escaping from said filtering unit comprises means for providing a pressurized gas within said filtering unit.

37. An apparatus according to claim 36 wherein said means for providing a pressurized gas within said filtering unit comprises corrosion-resistant material selected from the group consisting of PVC and stainless steel.

38. A method for removing residue from gas exhausted from a microelectronic device fabrication process, said method comprising the steps of:

pumping the gas through at least one filtering unit comprising a plurality of absorbers configured to absorb water entrained within said gas;

spraying a liquid on the plurality of absorbers to remove residue deposited within the at least one filtering unit by the process gas, wherein the liquid is supplied at a pressure of between about 0.5 Kg/cm$^2$ and about 1.5 Kg/cm$^2$; and preventing the water from escaping from the at least one filtering unit.

39. A method according to claim 38 wherein the liquid comprises water.

40. A method according to claim 38 wherein the step of preventing the water from escaping from the first filtering unit comprises providing the at least one filtering unit with an inert gas.

41. A method according to claim 38 wherein the gas is provided at a rate of between about 20 cm$^3$ per minute and about 40 cm$^3$ per minute.

42. A method according to claim 38 wherein the gas is selected from the group consisting of nitrogen and argon.

* * * * *